United States Patent [19]
Straub et al.

[11] Patent Number: 6,136,237
[45] Date of Patent: Oct. 24, 2000

[54] METHOD OF FABRICATING A FIBER-REINFORCED CERAMIC MATRIX COMPOSITE PART

[75] Inventors: Andreas Straub, Tarzana; Jerry Brockmeyer, Valencia; Eric Krieg, Simi Valley, all of Calif.

[73] Assignee: The Boeing Company, Seattle, Wash.

[21] Appl. No.: 09/290,450

[22] Filed: Apr. 13, 1999

[51] Int. Cl.[7] .................................................. B29B 15/00
[52] U.S. Cl. .......................... 264/40.1; 264/232; 264/640
[58] Field of Search ................................... 264/40.1, 678, 264/232, 340, 640, 641

[56] References Cited

U.S. PATENT DOCUMENTS

| | | | |
|---|---|---|---|
| 3,429,023 | 2/1969 | Blythe et al. . | |
| 3,952,460 | 4/1976 | Clements . | |
| 4,866,829 | 9/1989 | Oda . | |
| 4,990,295 | 2/1991 | Hida | 501/89 |
| 5,226,209 | 7/1993 | Baker . | |
| 5,351,395 | 10/1994 | Crawmer et al. . | |
| 5,851,737 | 12/1998 | Maruyama | 430/325 |

*Primary Examiner*—Christopher A. Fiorilla
*Attorney, Agent, or Firm*—Aston & Bird LLP

[57] ABSTRACT

A method for fabricating a fiber-reinforced ceramic matrix composite (FRCMC) part includes the steps of forming a blank from FRCMC material such that the blank has a dimension approximating a desired finished dimension for the part measuring the dimension of the blank in an unloaded condition, applying a load to the blank and then removing the load so as to cause permanent strain of the blank, measuring the dimension of the blank after the load has been applied and then removed, and comparing the measured dimension after loading to the previously measured dimension. In a preferred embodiment of the invention, if the dimension after loading differs from the dimension previously measured, the loading and measuring steps are repeated. After each loading cycle, the blank is measured and the measured dimension is compared to that previously measured after the prior loading cycle. The loading cycles are continued until the measured dimension differs from the previously measured dimension by less than a predetermined amount such that the blank has achieved dimensional stability with loading. After dimensional stability has been achieved, the final machining of the blank is performed to conform the dimension to the desired dimension.

16 Claims, 3 Drawing Sheets

METHOD OF FABRICATING A FIBER-REINFORCED CERAMIC MATRIX COMPOSITE PART

FIELD OF THE INVENTION

The invention relates to fabrication of parts from fiber-reinforced ceramic matrix composite materials.

BACKGROUND OF THE INVENTION

Fiber-reinforced ceramic matrix composite (FRCMC) materials are currently of interest for the fabrication of parts that operate under severe use conditions. FRCMC materials offer improved high-temperature strength, chemical resistance, and wear resistance relative to metallic and polymer materials. Moreover, FRCMC materials generally have higher strength-to-weight ratios than metals. Because of these and other advantageous properties of FRCMC materials, they are increasingly being used or studied for use in advanced pumps, turbomachinery, automotive engines, tooling, and other applications.

While FRCMC materials have many desirable properties, they also are subject to undergoing permanent residual strain when initially placed under load. While not wishing to be bound by theory, it is believed that the reinforcing fibers of the material, which are typically in the form of woven layers of fabric laid atop one another, change orientation slightly when the material is initially placed under load. Accordingly, when the part is initially loaded, microcracking of the ceramic matrix material occurs, allowing the fibers to change their alignment. As the fibers become differently oriented, the part can lengthen in the load direction, much as a woven basket can be lengthened by stretching it. When the initial load is removed, the reoriented fibers do not return to their original positions, but rather tend to remain in their new positions. As a result, the dimension of the part in the load direction permanently increases, and this increase in dimension is termed a residual strain herein.

Thus, a part made of FRCMC manufactured to desired shape and dimensions tends to permanently deform and therefore change shape and/or dimensions over the first several cycles of loading and unloading. The resulting part configuration may be significantly different from the designed configuration. In applications where the part dimensions are critical, this tendency to undergo permanent residual strain can lead to undesirable and even catastrophic consequences. For example, a turbine rotor made of FRCMC may undergo permanent radial expansion during initial spin-up, and thereby alter critical blade tip clearances, which can lead to losses in efficiency, disk imbalance, and/or blade damage.

Accordingly, it would be desirable to provide a method for fabricating a part from FRCMC so as to assure that the part has the desired shape and dimensions when placed into service and that the part will not significantly change shape or dimensions during use.

SUMMARY OF THE INVENTION

The above needs are met and other advantages are achieved by the present invention, which provides a method for fabricating a part from a fiber-reinforced ceramic matrix composite material wherein the part does not undergo a final machining operation to machine it to the desired final shape and dimensions until after the part has been placed under load and the part has permanently deformed. The method of the invention assures that the part, when finally machined and placed into service, will not undergo further permanent strain to any significant extent, and therefore the part shape and dimensions will better conform to those desired.

In accordance with a preferred embodiment of the invention, a method for fabricating a FRCMC part comprises the steps of forming a blank from fiber-reinforced ceramic matrix composite material such that the blank has a dimension approximating a desired finished dimension for the part, measuring said dimension of the blank in an unloaded condition, applying a load to the blank and then removing the load so as to cause permanent strain of the blank, measuring said dimension of the blank after the load has been applied and then removed, and comparing the measured dimension after loading to the previously measured dimension. If the dimension after loading differs from the dimension previously measured, the loading and measuring steps are repeated. After each loading cycle, the blank is measured and the measured dimension is compared to that previously measured after the prior loading cycle. The loading cycles are continued until the measured dimension differs from the previously measured dimension by less than a predetermined amount such that the blank has achieved dimensional stability with loading. After dimensional stability has been achieved, the final machining of the blank is performed to conform the dimension to the desired dimension. Of course, more than one dimension of the blank can be measured and monitored for determining when dimensional stability of the blank has been achieved. The present invention thus encompasses a "pre-machining shakedown cycle" whereby the permanent dimensional changes that inherently occur upon loading FRCMC material are produced, and then the part is machined to its final dimensions.

Preferably, the load that is applied should duplicate or at least closely approximate the type of load that the part is expected to encounter during service. Various methods and devices can be used within the scope of the invention for applying load to the blank. For example, where the part is to be used in a rotating machine and will be subjected to centrifugal loads during use, the load advantageously is applied by fixing the blank in a spin test rig and spinning the blank such that a centrifugal load is applied to the blank. By suitable design of the fixture securing the blank in the spin test rig and suitable selection of the rotational speed at which the blank is spun, the expected stresses that the part will encounter in service can be closely approximated in the blank. However, spin testing is not limited to parts that will be used in rotating devices, but can be used as well for loading parts intended for nonrotating applications through appropriate design of the test fixture. Alternatively, nonrotating linear loading devices can be used for loading the part.

If desired, a safety factor can be built into the method of the invention by calculating a load that will closely approximate a maximum level of stresses that the final part will experience in use, and applying a load to the blank slightly higher than the calculated load. For example, in one preferred embodiment of the invention, the blank is subjected to a load about 10–20 percent greater than the calculated load.

The first loading cycle exerted on the blank is particularly critical in the sense that most of the permanent residual strain experienced by the blank tends to occur in the first loading cycle. If the load is applied too rapidly, microrupture of the fibers of the material can occur, which is undesirable inasmuch as the strength of the FRCMC material is derived primarily from the fibers. Accordingly, in accordance with a preferred embodiment of the invention, at least the first loading cycle is accomplished by slowly ramping the load up from zero to a desired proof load. For instance, the load can be ramped up to the proof load at a constant rate over a period of about 3 minutes or greater. In a spin tester, this is accomplished by ramping up the rotational speed, but the same effect can be achieved with other types of loading devices. Slowly ramping up the load allows micro-cracking of the ceramic matrix to occur but minimizes micro-rupturing of the fibers of the material.

The invention also facilitates the discovery of critical material defects in a FRCMC part before the part is machined to final dimensions. When a part has a critical material defect compromising its strength, it may fail during the first few loading cycles in service. A significant advantage of the present invention is that those first few loading cycles occur during the pre-machining shakedown cycle. Thus, critical material defects can be discovered early, before substantial time and cost are devoted to final machining of the part.

The invention also encompasses a method for dimensionally stabilizing a part made of a fiber-reinforced ceramic matrix composite material, comprising the steps of measuring a dimension of the part in an unloaded condition after the part has been fabricated but before the part has been subjected to substantial load, applying a load to the part and then removing the load to cause permanent strain of the part so as to alter the dimension of the part, measuring said dimension of the part after the load has been applied and then removed, comparing the measured dimension after loading to the previously measured dimension, and repeating the steps of loading and unloading the part and measuring the dimension until the measured dimension differs from the previously measured dimension by less than a predetermined amount such that the part has achieved dimensional stability with loading.

The invention thus provides methods enabling the permanent strain behavior of FRCMC materials to be taken into account during the manufacturing of a part so that the finished shape and dimensions of the part better conform to those desired. Additionally, the invention facilitates the discovery of material defects at an early stage so that costs of further manufacturing operations can be avoided where the part fails during the pre-machining shakedown cycle.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
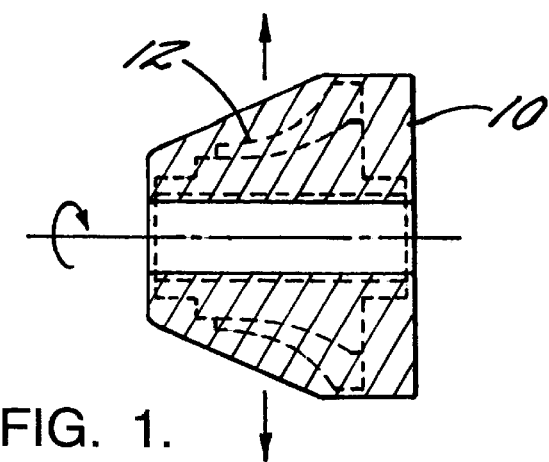
FIG. 1 is a side elevation of a blank for manufacturing a part from fiber-reinforced ceramic matrix composite material, the part to be manufactured being shown in dashed lines.

With reference to FIG. 1, a blank 10 for manufacturing a part from a fiber-reinforced ceramic matrix composite material is shown. The manufacturing of a part from FRCMC material typically begins by initially making a blank 10 that may be near the shape and dimensions of the final part but has excess material that will be machined away in the final machining operations to produce the finished part. For example, FIG. 1 schematically illustrates in dashed lines a part 12 that will be machined from the blank 10. In this regard, the manufacturing of FRCMC parts does not differ substantially from the manufacturing of parts from other materials wherein a blank is first cast or molded to near net shape and the blank is then machined to its final dimensions and shape.

The FRCMC blank 10 is typically made by forming a "preform" of continuous reinforcing fibers having roughly the shape of the desired blank, and then infiltrating the preform with a ceramic-forming material that is processed to form a ceramic matrix material binding the reinforcing fibers together. Various processes can be used for forming the ceramic matrix material. The preform is typically formed of a plurality of fabric layers woven from continuous high-strength fibers and laid atop one another to form a desired shape. The layers may be stitched together with additional high-strength fibers. The fibers can be of various high tensile-strength materials, including carbon, aramid, boron, silicon carbide, silicon nitride, alumina, and others. Various ceramic matrix materials can be used, including silicon carbide, silicon nitride, zirconia, alumina, aluminum nitride, and others. The continuous reinforcing fibers are generally aligned along directions in which it is desired to provide high tensile strength for the finished part to be manufactured.

FRCMC materials can provide extremely high tensile strengths and high strength-to-weight ratios, and thus are attractive candidates for parts that must withstand high tensile loads. However, FRCMC materials also are subject to undergoing permanent residual strain when initially placed under load. While not wishing to be bound by theory, it is believed that the reinforcing fibers of the material change orientation slightly when the material is initially placed under load. Accordingly, when the part is initially loaded, microcracking of the ceramic matrix material occurs, allowing the fibers to change their alignment. As the fibers become differently oriented, the part can lengthen in the load direction, much as a woven basket can be lengthened by stretching it. When the initial load is removed, the reoriented fibers do not return to their original positions, but rather tend to remain in their new positions. As a result, the dimension of the part in the load direction permanently increases.

Figure 2:
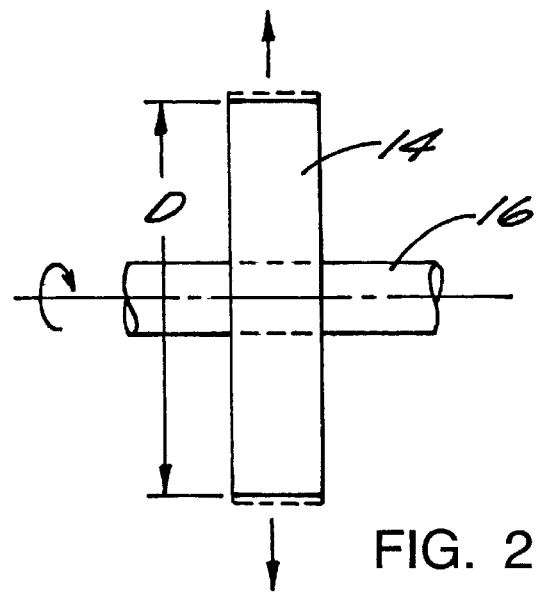
FIG. 2 is a side elevation of the blank installed on a rotating spindle of a spin-test rig.

For example, FIG. 2 schematically illustrates a blank or part 14 of FRCMC material intended for use as a rotating part. The part 14 may be, for example, a turbine disk or the like. When the part 14 is installed on a shaft or spindle 16 and rotated at high speed, centrifugal forces place the part 14 in radially outward tension as indicated by the arrows. These centrifugal forces tend to cause the part 14 to grow in the radial direction, as shown by the dashed lines. This growth is not an elastic deformation but a permanent one that remains even when the rotation of the part is stopped. It will be appreciated that in some applications, such changes in part dimensions can be highly undesirable or even catastrophic.

The present invention takes this permanent residual strain behavior of FRCMC materials into account during the manufacturing of a part, allowing the production of a dimensionally stable part with the correct shape and dimensions. In accordance with the invention, a blank of FRCMC material is first formed having approximately the shape and dimensions of a finished part to be produced. The blank will generally have excess material at least in some regions of the blank, which excess material will be machined away during final machining operations. However, before the final machining operations are performed, the blank is put through a pre-machining shakedown cycle in order to dimensionally stabilize the blank. Once the blank has been dimensionally stabilized, the final machining operations are performed.

Figure 3:
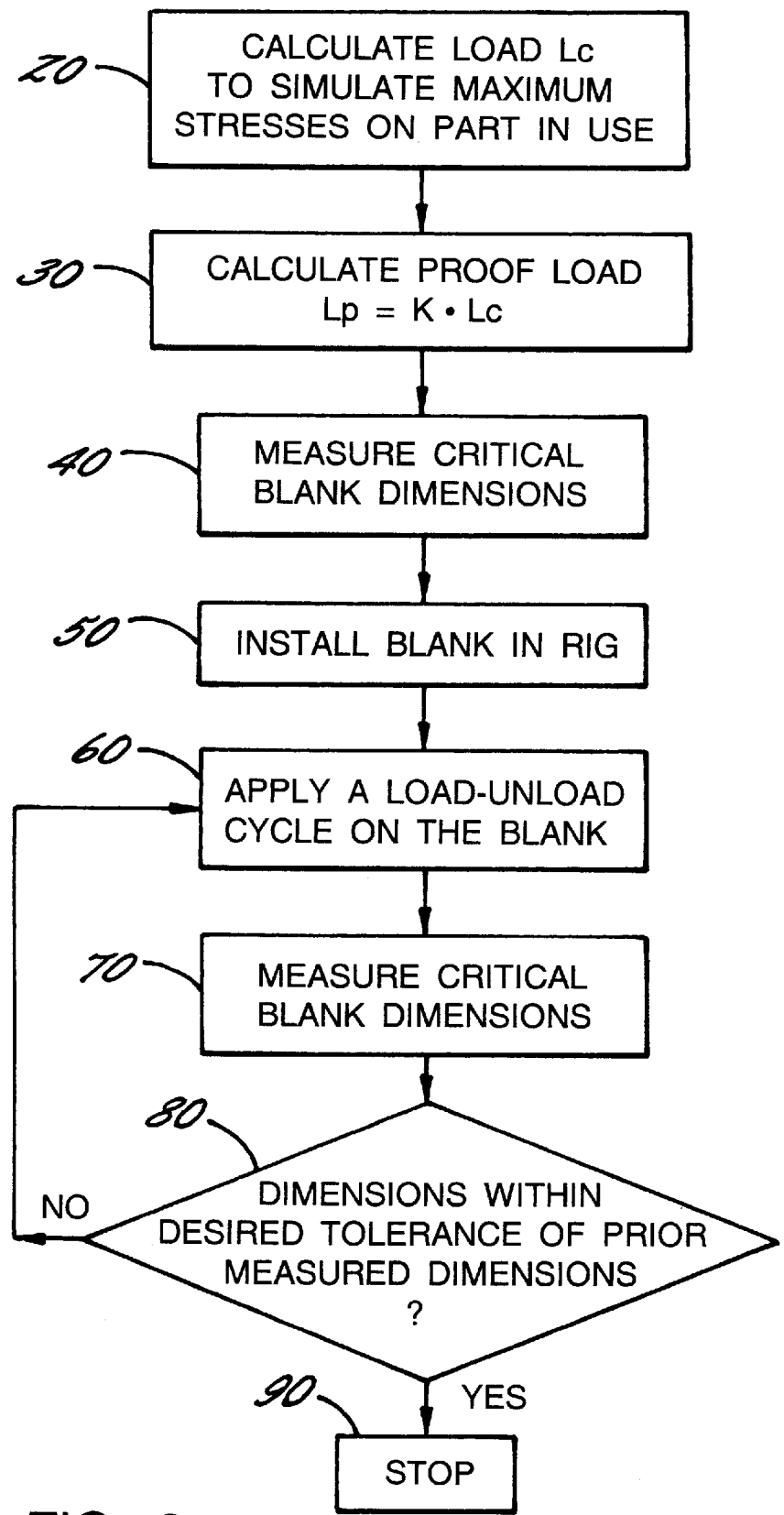
FIG. 3 is a flow chart depicting the steps of a method in accordance with a preferred embodiment of the invention for achieving dimensional stability of a part or blank.

With reference to FIG. 3, a process diagram or flow chart of a pre-machining shakedown cycle in accordance with a preferred embodiment of the invention is shown. The pre-machining shakedown cycle generally involves placing a blank of FRCMC material under the types of loads the finished part will experience in use, and allowing the permanent residual strain to take place before the final machining is performed. To this end, as indicated at 20, calculations are performed to determine a load $L_c$ that can be applied by a suitable loading device in order to place the blank, such as the blank 14 of FIG. 2, under stresses that closely approximate the maximum stresses that the finished part will experience in use. The loading device ideally should be operable to replicate the loads that the part will experience in use, but in some cases of complex loading it may not be feasible or practical to precisely replicate the actual loads. Nevertheless, the loading device should approximate as closely as practicable the actual loads.

In some cases where the finished part is to be used in rotating machinery and will experience centrifugal loading in use, a spin-test rig advantageously can be used for loading the blank during the pre-machining shakedown cycle. For example, FIG. 2 shows a blank 14 for a rotating disk or the like installed on a shaft or spindle 16 of a spin-test rig (not shown). However, the present invention is not limited to parts that are used in rotating environments, but is also useful for non-rotating parts that are statically and/or dynamically loaded in other ways. Such loads can be simulated by design of a suitable fixture for securing a blank in a spin-test rig, or by using any other suitable loading device. The present invention is not limited to any particular type of loading device.

Once the load $L_c$ has been determined, the load preferably is scaled up by a scale factor K as indicated at 30, to arrive at a proof load $L_p$ that will be applied to the blank during the pre-machining shakedown cycle. The scale factor K preferably is at least about 1.1 to 1.2. The purpose of the scale factor K is to account for uncertainties in the calculations of the stresses on the part and the blank. A minimum scale factor K of about 1.1 advantageously is used for rotating parts that will be centrifugally loaded in a spin-test rig during the pre-machining shakedown cycle. For non-rotating parts that will be loaded in a spin-test rig, a minimum scale factor K of about 1.2 advantageously is used.

Next, at 40 in FIG. 3, one or more critical dimensions of the blank are measured and recorded. For example, for the blank 14 of FIG. 2, a diameter D of the blank can be measured and recorded. The blank is then installed in a spin-test rig or other loading device, as indicated at 50, and a load is applied to the blank to cause the blank to undergo permanent strain and the load is then removed as shown at 60. The critical dimensions of the blank are measured again and recorded at 70. As shown at 80, the measured dimensions are compared to the corresponding dimensions that were previously measured. If the newly measured dimensions differ from the prior dimensions by more than a predetermined tolerance (or a separate tolerance may be used for each dimension), steps 60 and 70 are repeated. The loading and measuring steps are repeated until the measured dimensions are within the desired tolerances of the previously measured dimensions, whereupon the pre-machining shakedown cycle is stopped at 90. Following the pre-machining shakedown cycle, if desired, the blank can be machined to desired shape and dimensions to form a finished part. By conducting the pre-machining shakedown cycle, the shape and dimensions of the resulting part should be much more dimensionally stable when the part is placed into service and subjected to loading, relative to a conventional FRCMC part for which such loading would produce substantial residual strains.

Figure 4:
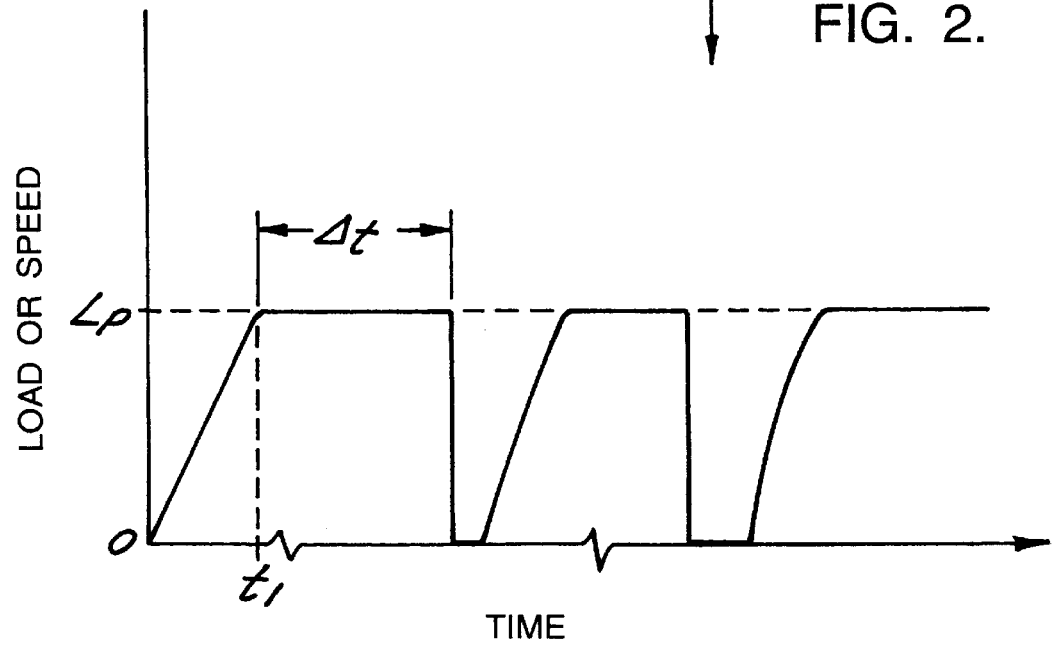
FIG. 4 is a graph showing load or spin-test rig speed for a pre-machining shakedown cycle in accordance with a preferred embodiment of the invention.

In some cases it can be important not to apply load to the blank too rapidly. If the proof load $L_p$ is applied too suddenly, micro-rupturing of the reinforcing fibers can occur, which is undesirable inasmuch as the tensile strength of FRCMC materials is derived almost entirely from the fibers. Accordingly, the proof load, particularly for the first loading cycle, preferably should be applied gradually so that the ceramic matrix has time to undergo micro-cracking and allow the misaligned fibers to become aligned without rupturing. For example, FIG. 4 shows a plot of load (or rotational speed of a spin test rig, since speed and load are proportional to each other) versus time for a pre-machining shakedown cycle in accordance with a preferred embodiment of the invention. The initial loading is applied by ramping the load up at a generally constant rate until the proof load $L_p$ is reached at time $t_1$. Preferably, the time $t_1$ is at least about 3 minutes. The proof load $L_p$ is then held generally constant for a period of time $\Delta t$ that is equal to the duration of one mission cycle that the finished part is expected to undergo in use. As previously described, the part is then unloaded, and the dimensions of the part are measured and compared to the previously measured dimensions. The part is then loaded again to the proof load $L_p$, held at the proof load for a mission cycle duration, unloaded, and the dimensions are measured and compared again. The second and subsequent loading cycles preferably are performed similarly to the first loading cycle, i.e., by ramping the load up gradually.

In some cases, it might be learned by experience gained through performing pre-machining shakedown cycles on multiple parts of identical configuration, that a single loading cycle produces the vast majority of the total residual strain the part will undergo. In such cases, it may be advantageous to dispense with subsequent loading cycles and to perform final machining of the part after a single loading cycle.

The pre-machining shakedown cycle of the present invention can also serve as a proof test for discovering serious material defects that would otherwise lead to part failure during the first or first few mission cycles. Where the part fails during the pre-machining shakedown cycle, the final machining operations that would have been performed on the part can be avoided, thus saving time and expense.

Figure 5:
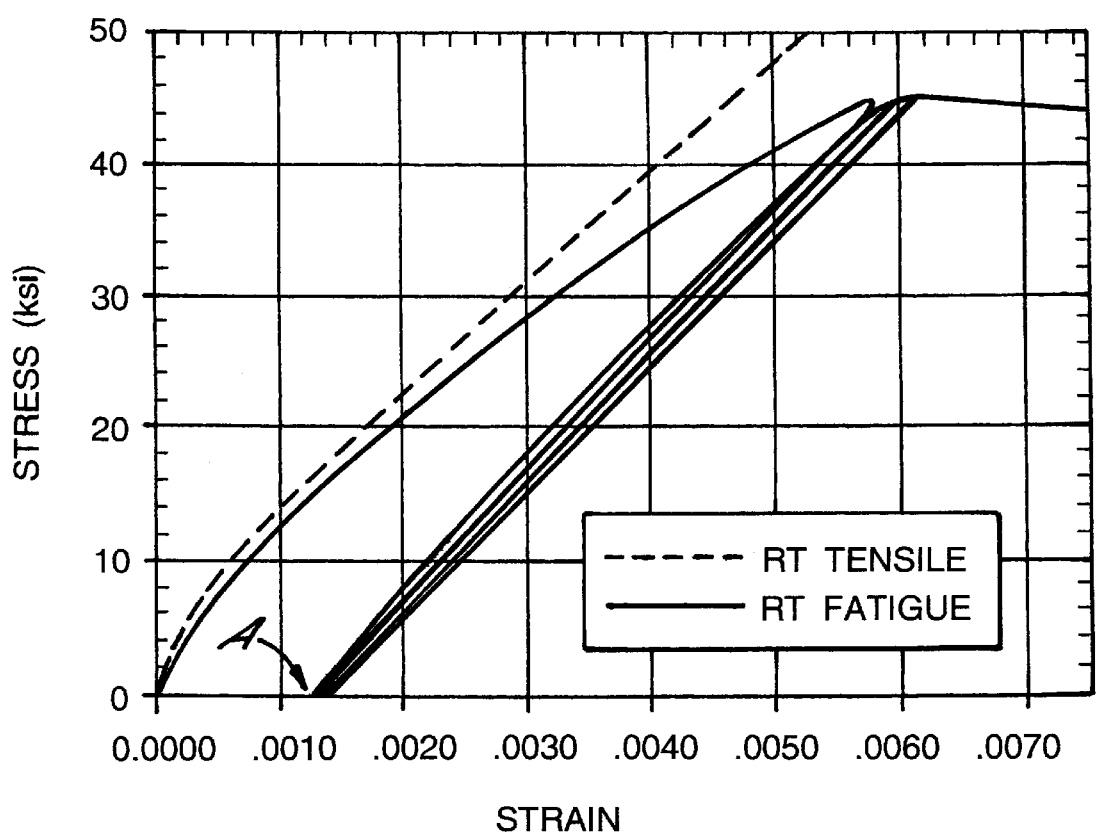
FIG. 5 is a graph of test results showing the stress-strain behavior of a sample test article made of FRCMC material placed under a series of pure tensile loading and unloading cycles.

A series of tests were performed to investigate the permanent strain behavior of FRCMC materials. In one test, two substantially identical sample tensile test articles of carbon fiber-reinforced silicon carbide ceramic matrix were prepared. One of the test articles was installed in a tensile testing machine and subjected to a gradually increasing tensile load until the article failed. The other article was subjected to a series of pure tensile loading and unloading cycles in a manner similar to FIG. 4. Strain was measured for each of the articles using a strain gage, and the stress-strain behaviors of the test articles were plotted as shown in FIG. 5. The stress-strain curve for the article that was loaded to failure is indicated by the dashed line (the upper end of the curve where failure occurred not being shown), and the cyclically loaded article's stress-strain curve is shown in solid line. It will be noted that the two articles do not have identical stress-strain behavior; the difference is thought to arise from slight differences in fiber placement and alignment between the two articles. Nevertheless, the test results demonstrate the permanent strain behavior of FRCMC material. The cyclically loaded test article was loaded up to a stress of about 42 ksi, and then unloaded back to zero stress as indicated at point A. There was a permanent residual strain of about 0.0013 in/in after the first loading cycle. The article was then loaded again up to 42 ksi and unloaded. The permanent strain increased very slightly. A third loading cycle was performed, and the permanent strain again increased very slightly. After three loading cycles, the permanent strain was about 0.0015 in/in. Thus, in this particular case, the vast majority of the permanent strain occurred after one loading cycle.

It has also been found that the ultimate tensile strength of tensile test articles of FRCMC material can be increased by about 2 to 5 percent when the pre-machining shakedown cycle is performed. Thus, the invention also has the unexpected benefit of potentially increasing the strength of a part prior to the part being placed into service.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for fabricating a part from fiber-reinforced ceramic matrix composite material, the method comprising:
   forming a blank from fiber-reinforced ceramic matrix composite material such that the blank has a dimension approximating a desired finished dimension for the part;
   applying a load to the blank and then removing the load to cause permanent strain of the blank so as to alter the dimension of the blank; and
   performing final machining of the permanently strained blank to conform the dimension to the desired finished dimension.

2. The method of claim 1, further comprising the steps of:
   measuring said dimension of the blank in an unloaded condition before the blank has been subjected to load;
   measuring said dimension of the blank after the load has been applied and then removed;
   comparing the measured dimension after loading to the previously measured dimension; and
   repeating the steps of loading and unloading the blank and measuring the dimension until the measured dimension differs from the previously measured dimension by less than a desired tolerance such that the blank has achieved dimensional stability with loading;
   the final machining step being performed after the blank has become dimensionally stable.

3. The method of claim 2, wherein the measuring steps comprise measuring a plurality of different dimensions of the blank and the comparing step comprises comparing each measured dimension to the corresponding previously measured dimension, final machining being performed after all of the measured dimensions have achieved stability with loading.

4. The method of claim 2, wherein the first loading step comprises ramping the load on the blank from zero load up to a proof load at a ramp rate that is sufficiently low to allow micro-cracking of the matrix while minimizing fiber micro-rupture of the blank.

5. The method of claim 4, wherein the step of ramping up the load comprises ramping up to the proof load at a substantially constant rate over a period of at least about 3 minutes.

6. The method of claim 1, wherein the step of applying load comprises fixing the blank in a spin test rig and spinning the blank so as to subject the blank to centrifugal loading.

7. The method of claim 6, wherein the spinning step comprises spinning the blank at a rotational speed sufficient to subject the blank to a centrifugal tensile load along a direction of the blank, the tensile load being about equal to a load expected to be exerted on the part during use.

8. The method of claim 7, wherein the spinning step comprises spinning the blank at a speed sufficient to subject the blank to a tensile load about 10–20 percent greater than a maximum tensile load expected to be exerted on the part during use.

9. The method of claim 1, wherein the step of forming the blank comprises rough-machining the blank from a piece of fiber-reinforced ceramic matrix composite material such that the blank has excess material, and wherein the excess material is removed in the final machining step.

10. A method for dimensionally stabilizing a part made of a fiber-reinforced ceramic composite material, comprising:
    measuring a dimension of the part in an unloaded condition after the part has been fabricated but before the part has been subjected to substantial load;
    applying a load to the part and then removing the load to cause permanent strain of the part so as to alter the dimension of the part;
    measuring said dimension of the part after the load has been applied and then removed;
    comparing the measured dimension after loading to the previously measured dimension; and
    repeating the steps of loading and unloading the part and measuring the dimension until the measured dimension differs from the previously measured dimension by less than a desired tolerance such that the part has achieved dimensional stability with loading.

11. The method of claim 10, wherein the measuring steps comprise measuring a plurality of different dimensions of the part and the comparing step comprises comparing each measured dimension to the corresponding previously measured dimension.

12. The method of claim 10, wherein the step of applying load comprises fixing the part in a spin test rig and spinning the part so as to subject the part to centrifugal loading.

13. The method of claim 12, wherein the spinning step comprises spinning the part at a rotational speed sufficient to subject the part to a centrifugal tensile load along a predetermined direction of the part, the tensile load being about equal to a load expected to be exerted on the part during use.

14. The method of claim 13, wherein the spinning step comprises spinning the part at a speed sufficient to subject the part to a tensile load about 10 percent greater than a maximum tensile load expected to be exerted on the part during use.

15. The method of claim 10, wherein the first loading step comprises ramping the load on the part from zero load up to a proof load at a ramp rate that is sufficiently low to allow micro-cracking of the matrix while minimizing fiber micro-rupture of the part.

16. The method of claim 15, wherein the step of ramping up the load comprises ramping up to the proof load at a substantially constant rate over a period of at least about 3 minutes.

* * * * *